US006835141B2

(12) United States Patent
Eaves

(10) Patent No.: US 6,835,141 B2
(45) Date of Patent: Dec. 28, 2004

(54) MOTION THERAPY DEVICE

(76) Inventor: Michelle R. Eaves, 6294 Hunting Creek Rd., Atlanta, GA (US) 30328

(*) Notice: Subject to any disclaimer, the term of this patent is extended or adjusted under 35 U.S.C. 154(b) by 53 days.

(21) Appl. No.: 10/015,455

(22) Filed: Dec. 13, 2001

(65) Prior Publication Data

US 2002/0082535 A1 Jun. 27, 2002

Related U.S. Application Data

(60) Provisional application No. 60/255,219, filed on Dec. 13, 2000.

(51) Int. Cl.[7] ........................ A63G 17/00; A63G 19/20; B60R 21/02

(52) U.S. Cl. ......................... 472/97; 472/100; 297/181; 297/464

(58) Field of Search ........................... 280/250.1, 304.1, 280/270, 304.4; 472/1, 97, 100, 130, 410, 96, 2, 3, 13, 27, 28, 29, 32, 36, 43; 434/247, 55; 104/61, 62, 53; 297/61, 181, 410, 112, 464

(56) References Cited

U.S. PATENT DOCUMENTS 3,640,571 A * 2/1972 Keropian .................... 297/464
3,815,586 A * 6/1974 Kazik .......................... 606/237
4,617,919 A * 10/1986 Suhre ....................... 280/250.1
4,728,119 A * 3/1988 Sigafoo ................... 280/250.1
4,807,870 A * 2/1989 Hickman ........................ 297/5
5,308,028 A * 5/1994 Kornberg ................. 280/304.1
5,785,340 A * 7/1998 Dias ......................... 280/304.1
6,152,828 A * 11/2000 Tomita et al. .............. 472/130
6,154,690 A * 11/2000 Coleman ................. 280/250.1

* cited by examiner

*Primary Examiner*—Danton DeMille
(74) *Attorney, Agent, or Firm*—Womble Carlyle Sandridge & Rice, PLLC

(57) ABSTRACT

An apparatus for providing motion therapy to a physically-challenged child includes an adjustable seat attached to the base of an amusement-type carriage device by a spring mechanism and having a back portion to provide lower back support to the child. An adjustable torso support mechanism is mounted on the amusement-type carriage device and provides lateral support to the child while seated on the ride. The torso support includes rotatable support arms to which are fastened adjustable hand brackets and hand pads, all mounted on vertically-positioned spine rods. An adjustable headrest support is mounted on the amusement-type carriage device to provide head and neck support to the child. An adjustable shoulder strap secures the child in a stable position during operation. A lap belt is also provided to securely position the child inside the torso support mechanism.

16 Claims, 8 Drawing Sheets

MOTION THERAPY DEVICE

CROSS REFERENCE TO RELATED APPLICATION

The present patent application is a formalization of a previously filed, co-pending provisional patent application entitled "Motion Therapy Device", filed Dec. 13, 2000, as U.S. patent application Ser. No. 60/255,219 by the inventor as named in this patent application. This patent application claims the benefit of the filing date of the cited provisional patent application, according to the statues and rules governing provisional patent applications, particularly 35 USC §119(e)(1) and 37CFR §§1.789(a)(4) and (a)(5). The specification, drawings, and photographs of the provisional patent application are specifically incorporated herein by reference.

BACKGROUND OF THE INVENTION

The present invention is generally related to therapeutic devices for physically-challenged persons. More particularly, the present invention relates to an apparatus for providing motion therapy to physically-challenged persons.

Physically-challenged or handicapped persons (particularly children) have very few opportunities to experience amusement type rides, such as are found in amusement parks, or as coin-operated rides in major discount department stores and shopping malls. Persons having severe neuromuscular dysfunctions and other handicaps are in need of devices that can provide motion therapy. The requirement of such a device is that it supports a handicapped or physically-challenged person in a position for vestibular therapy.

SUMMARY OF THE INVENTION

The present invention provides a handicapped or physically-challenged child with a motion therapy device that enables a child to receive vestibular motion while riding an amusement-type ride thereby stimulating brain chemistry. The invention is adaptable to any type of amusement ride that a non-physically-challenged child of the same relative size would be capable of riding.

The apparatus of the present invention includes an adjustable seat attached to the base of the amusement-type ride by a spring mechanism and having a back portion to provide lower back support to the child. An adjustable torso support mechanism is mounted on the amusement-type ride and provides lateral support to the child while seated on the ride. The torso support includes rotatable support arms to which are fastened adjustable hand brackets and hand pads, all mounted on vertically-positioned spine rods. An adjustable headrest support is mounted on the carriage device to provide head and neck support to the child. An adjustable shoulder strap secures the child in a stable position during operation. A lap belt is also provided to securely position the child inside the torso support mechanism.

DESCRIPTION OF THE DRAWINGS

The invention is better understood by reading the following detailed description of an exemplary embodiment in conjunction with the accompanying drawings.

DETAILED DESCRIPTION OF THE INVENTION

The present invention is designed to enable physically-challenged persons, primarily children, to experience amusement type rides, such as are found in amusement parks or as typically used for coin-operated rides. In addition to allowing physically-challenged or disabled persons to experience a typical amusement ride, the device of the present invention further is designed to stimulate vestibular motion and provide motion therapy benefits or effects, as well as promote self-esteem and feelings of independence for the physically-challenged user. The apparatus can provide the sensation of motion in one or more planes, and about one or more axes of rotation.

The present invention can be used at amusement parks, shopping malls, discount department stores, or at therapy centers for physically-challenged persons. The system of the present invention can be applied as a retrofit to an existing amusement ride or coin-operated type ride, or can be constructed as a new, self-contained system. As used herein, an amusement or coin-operated rider device is referred to generically as a carriage device. Such rides include pony walker type devices as well as other types of amusement rides that have appeal to most young children, whether physically-challenged or not. One such amusement ride to which the present invention has been adapted is based on the Marsupilami character developed as a kind of parody of all comic book animals by a Belgian artist 50 years ago. This character has great mass appeal to children as well as adults, and is one of the best-known comic characters in Europe.

Figure 1:
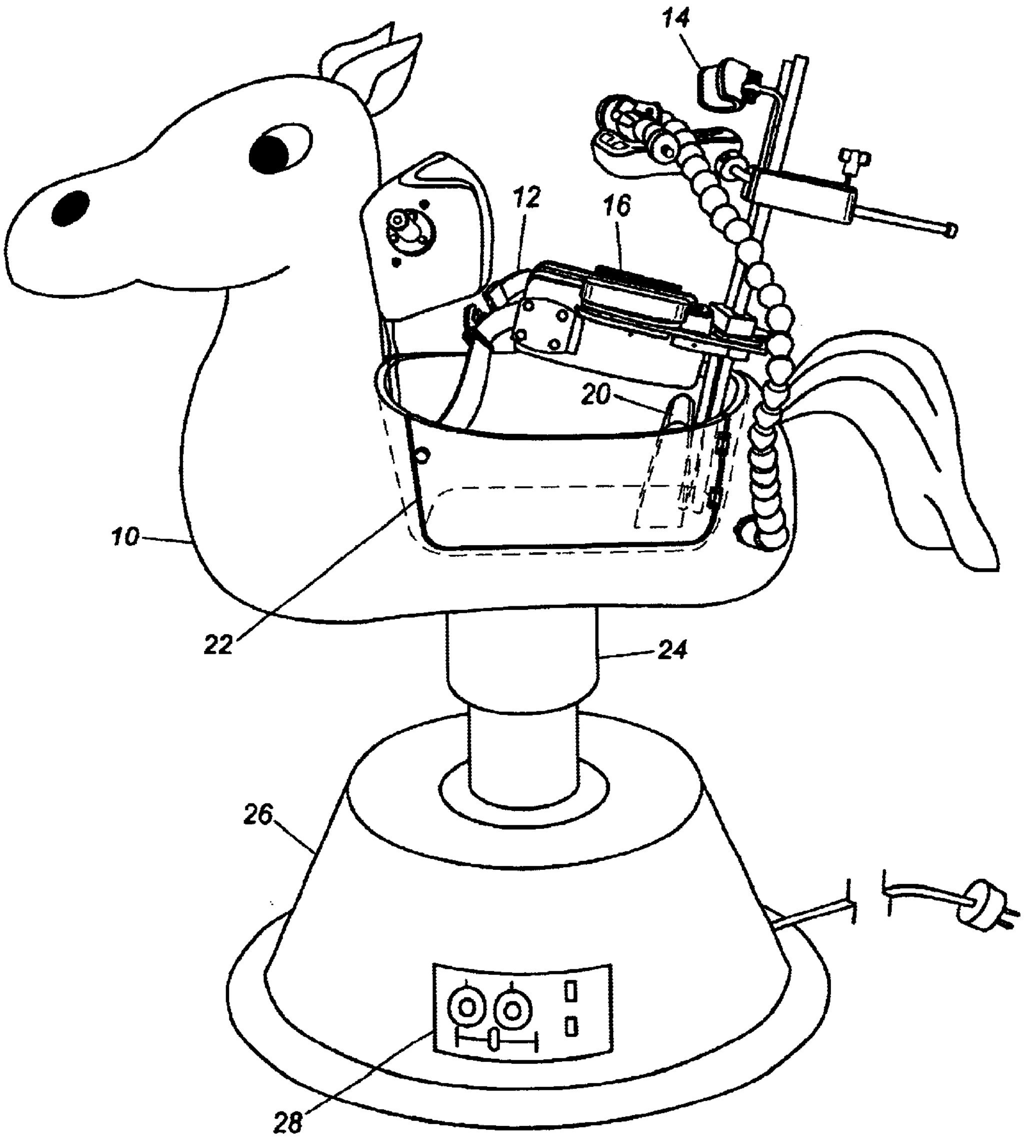
FIG. 1 illustrates a child amusement ride to which the present invention is adaptable for use.

As illustrated in FIG. 1, in an exemplary embodiment, the present invention can be used in a horse-rider type device. The body of the ride can be formed as a rocking horse or "pony walker" type ride, which includes a decorative body 10, e.g., formed as the body of a horse or similar animal, with an adjustable seat 20 attached to a base 26 by a spring mechanism 24 or similar drive that enables the body of the horse to move, such as in a bouncing action or similar motion. The base attachment 26 can include a pivoting ball, or universal pivoting joint for enabling rotation or pivoting of the ride body from side to side or front to back. Typically, the base will also be provided with controls 28 for regulating the movement and the duration of the ride. The body 10 of the ride can also include a door 22 to enable easier access to the seat portion 20 of the ride, although a door is not a required addition. The ride includes a torso support 16 and hip support, and the adjustable seat assembly 20 is generally constructed to further provide lower back support 18 to the user/rider. The torso support 16, hip support, and back support 18 all include adjustable pads for supporting the user in an upright and stable orientation during operation of the ride. The device further includes arm supports, and/or a chest pad or support which can be adjusted as needed to fit the rider or user, as well as adjustable shoulder straps 12 to further secure the rider or user in a stable, upright orientation during operation of the ride.

One embodiment of the invention has been implemented on a carriage device that is based on a child's coin-operated ride that has been modified to securely hold a child with minimum or no muscular control. The base carriage device is a German-built Marsupilami, model 230-MP, coin operated ride. The motor of the ride operates on 115 VAC, while all the controls and electronics operate on 12 VDC power through an internal transformer/converter.

Although the invention is described herein in terms of modifications to the popular Marsupilami amusement device, the invention is applicable to any amusement-type ride device adapted to stimulate vestibular motion and provide motion therapy to physically challenged users. The reference to Marsupilami device herein is solely for convenience and is not a limitation of the invention. Several modifications to the standard Marsupilami ride were required in order to develop the ride as a motion therapy device. These modifications included the removal of the existing handholds and repair of the fiberglass and paint in the chest area, removal of the existing coin-activated switch module and counter, and the removal of the coin well and lock. Several holes were drilled into the fiberglass body, as well as the internal steel support frame for the attachment of the support mechanisms of the present invention. FIGS. 8–11 illustrate different views of an implementation of the apparatus of the present invention on a modified Marsupilami device. The separate components including headrest support and torso support are described more fully below. Like numerals are used to refer to like parts throughout the description.

Figure 8:
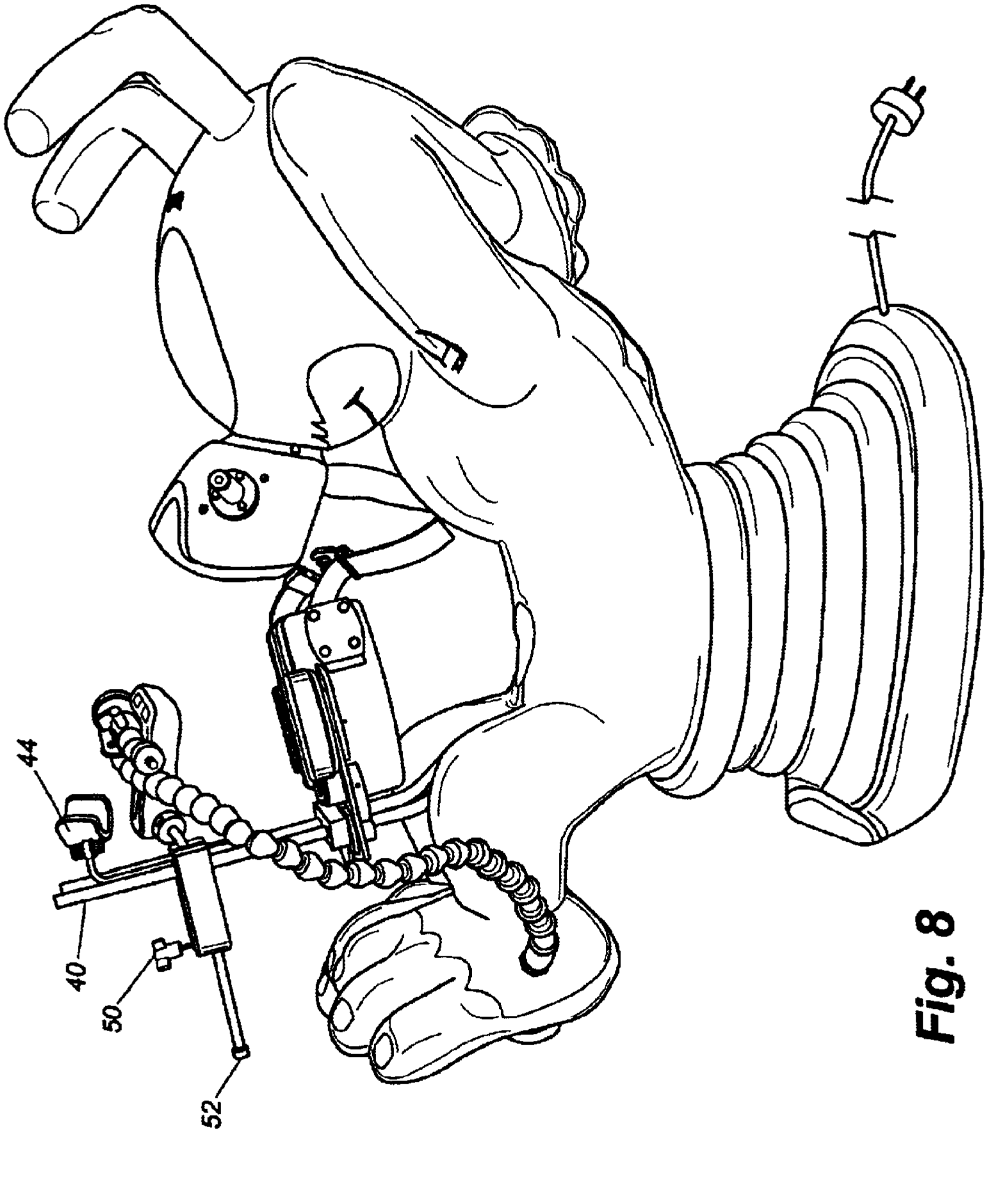
FIG. 8 illustrates a perspective view of an embodiment of the present invention as implemented on an amusement-type ride.
Figure 9:
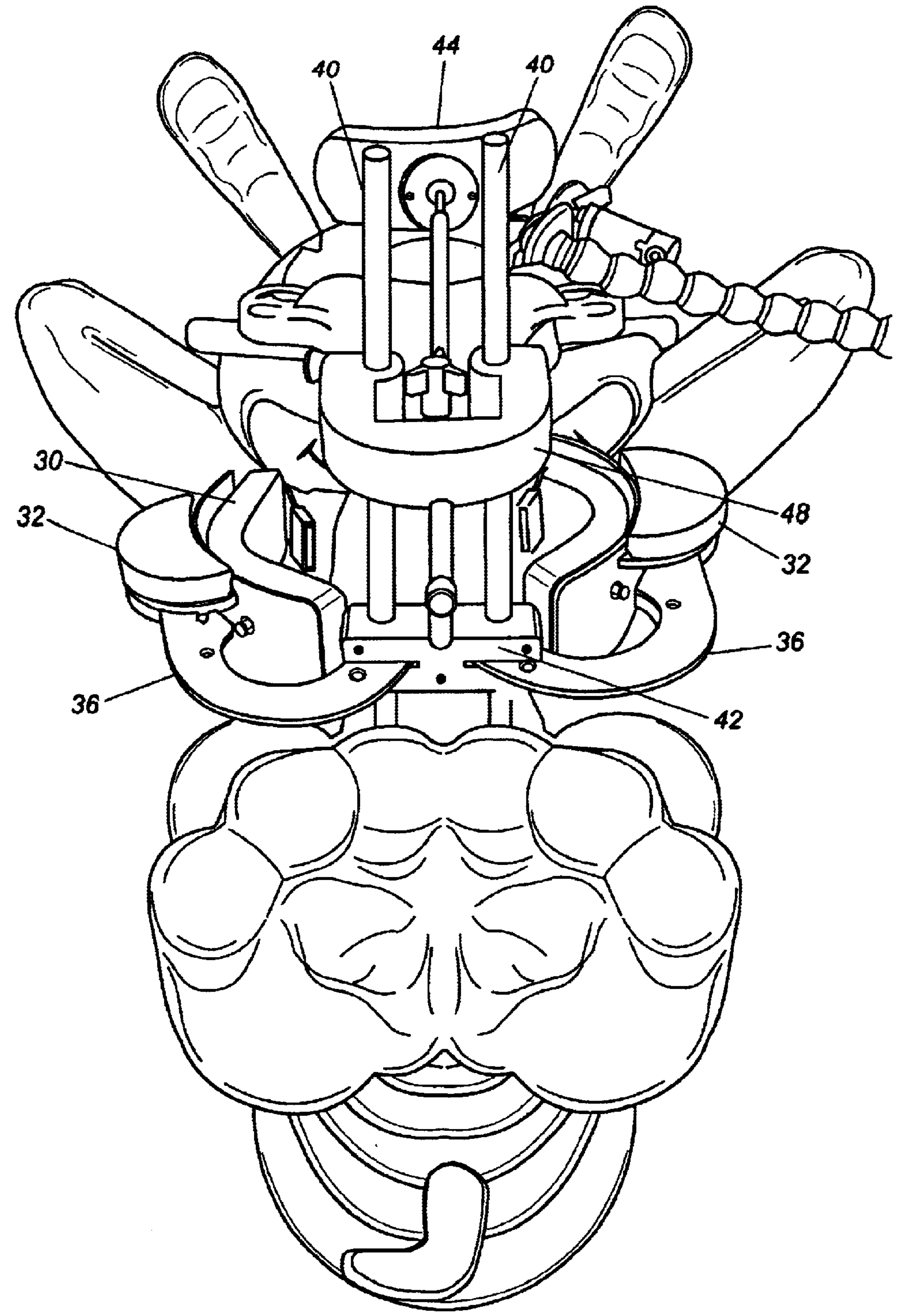
FIG. 9 illustrates a rear view of an embodiment of the present invention as implemented on an amusement-type ride.
Figure 10:
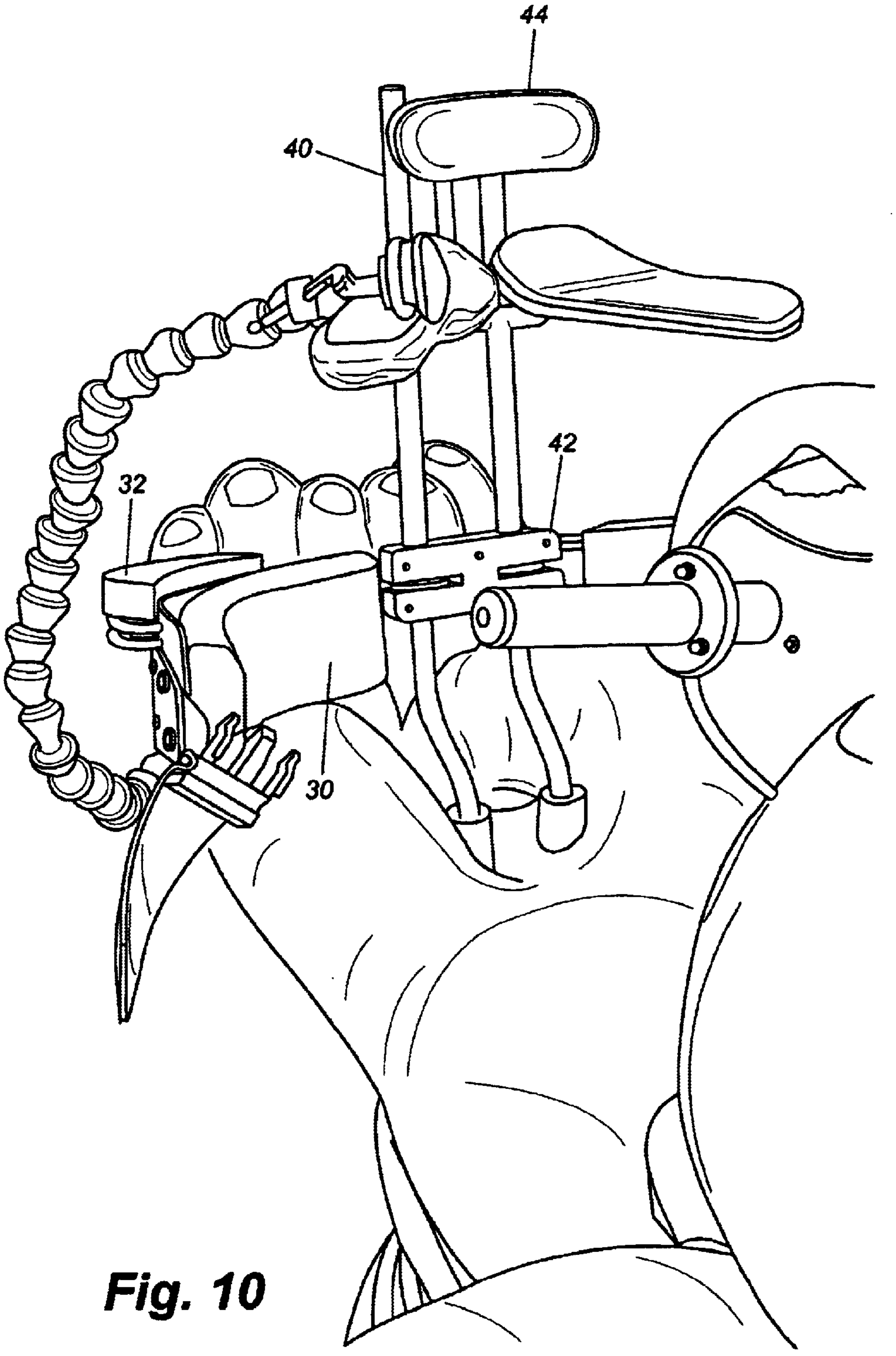
FIG. 10 illustrates a front view of an embodiment of the present invention as implemented on an amusement-type ride.
Figure 11:
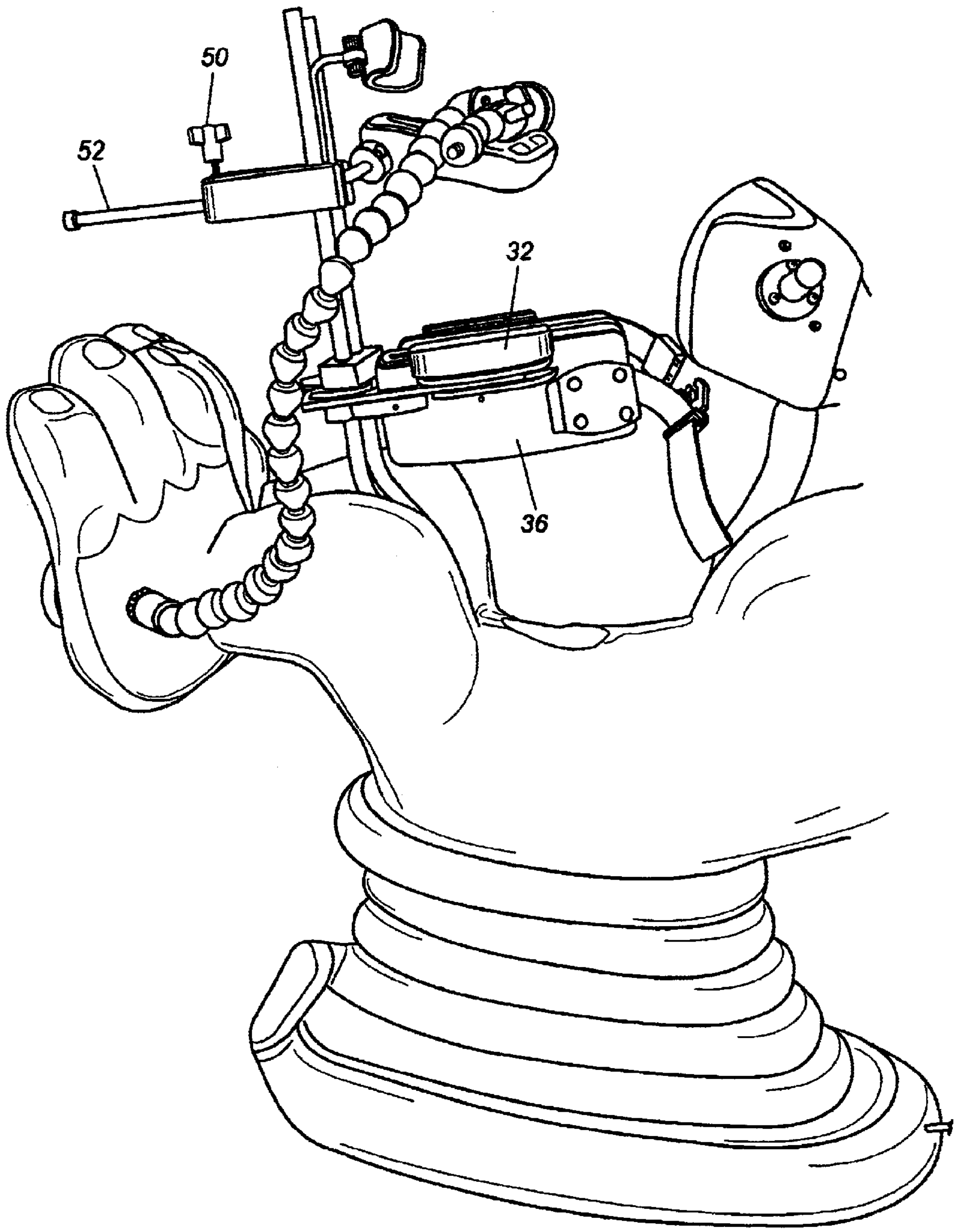
FIG. 11 illustrates a side view of an embodiment of the present invention as implemented on an amusement-type ride.

FIG. 8 illustrates a perspective view of the inventive apparatus as implemented on the modified Marsupilami device. FIG. 9 illustrates a rear view; FIG. 10 illustrates a front view; and FIG. 11 illustrates a side view of this embodiment of the inventive apparatus as implemented on the modified Marsupilami device.

The modified Marsupilami ride is designed to be operated either by the child via a head switch, or by a supervising adult. Once the child is placed on the seat and secured using the two arms and headrest, the unit can be turned on and will rock back and forth and play music. The unit will run for a preset period of time and then stop.

Figure 2:
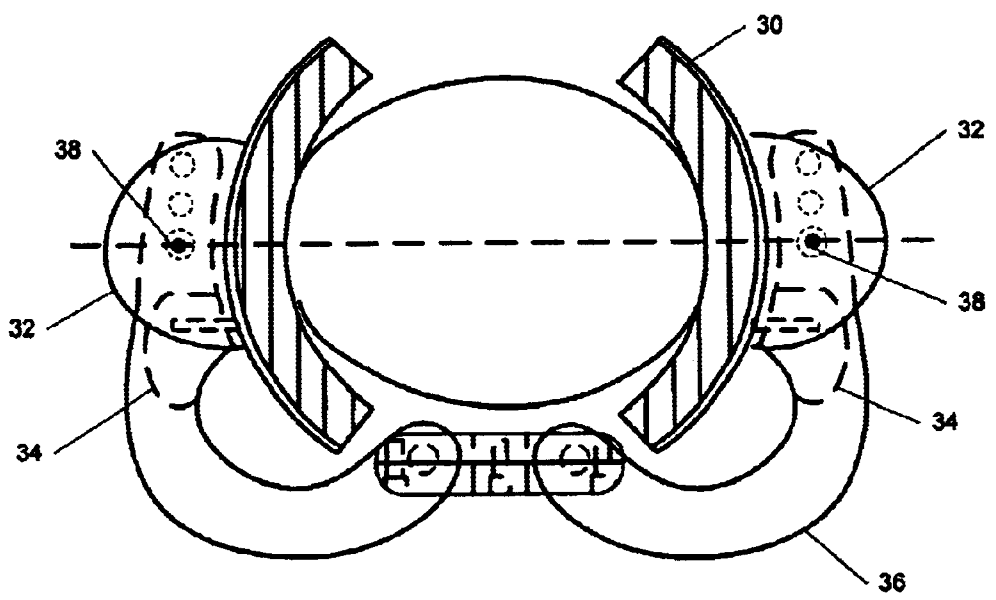
FIG. 2 illustrates a torso support configuration top view in accordance with an exemplary embodiment of the present invention.
Figure 3:
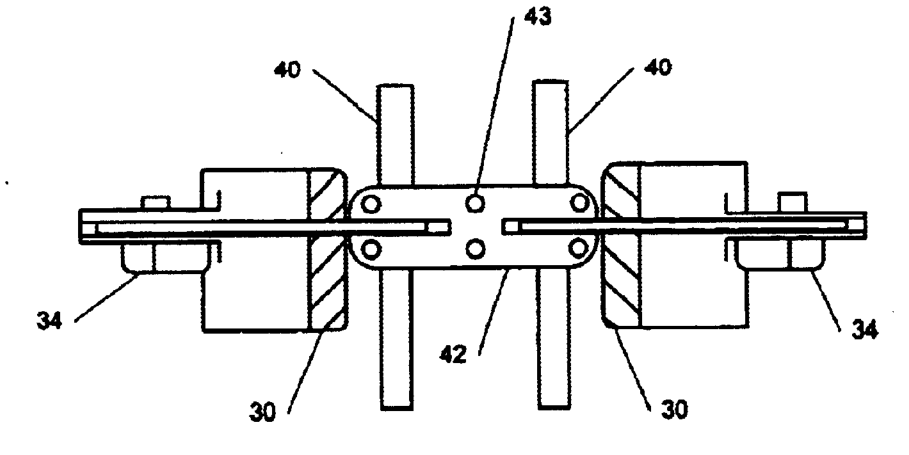
FIG. 3 illustrates a torso support configuration rear view in accordance with an exemplary embodiment of the present invention.

FIGS. 2–3 illustrate a top and rear view, respectively, of the torso support configuration used in the modified Marsupilami device. Rotatable arm plates 36 are attached to vertical spine rods 40 and have adjustable hand brackets 32 mounted to the arm plates 36 by mounting screw 38. Three alternative positions for securing the hand brackets 32 to the arm plates 36 are shown. Movement of the hand bracket is limited by rear stop plates 34. Hand pads 30 are affixed to the hand brackets 32. Shoulder block 42 attaches the torso support mechanism to the stainless steel upright (spine) rods 40.

In use, the modified Marsupilami device has to be adjusted to fit the child rider. The torso support arms 36 are swung away from the center and the head rest support (FIG. 4, element 44) is slid back before placing the child onto the Marsupilami's lap with the child's legs straddling the fiberglass waist of the ride. The support arms 36 are then swung toward the child and the height of the hand pads 30 are then checked. The pads 30 should support the child underneath the arms, on either side of the rib cage. The pads 30 must be placed low enough so that the child's arms are at a comfortable angle from the shoulder and not sticking straight out from the child's body. To adjust the height, the bolts 43 that attach the shoulder block 42 to the stainless steel uprights 40 are loosened. The arm assembly 36 is then slid up or down on the spine rods 40 to the correct height before retightening the bolts 43. The hand pads 30 are then checked to ensure they are supporting the child evenly and are not tilting forwards or backwards. This exemplary embodiment has three mounting locations for the hands 32 on the arm. A smaller child may need the hands 32 placed closer to the shoulder, whereas a larger child may need the hands 32 placed closer to the nose of the Marsupilami. To adjust the hand mounting locations, the socket head bolt 38 must be removed from the top plates of the hand bracket 32. The hand brackets 32 are slid forward or backwards until the holes line up, at which time the socket head bolt 38 is reinstalled.

The hand pads 30 are then secured around the child's torso by latching the nylon lap belt. The length of the belt needs to be adjusted so that the hand pads 30 fit snuggly against the child and there is an equal gap between the hand pads 30 front and back. The child's back is then checked to ensure that it is not pressing against the shoulder block 42. If the child's back is too close, a fine adjustment to the underside of the arms can be made. The steps of securing the hand pads 30 around the child's torso and checking that the child's back is not pressing against the shoulder block 42 should be done simultaneously to be sure that the hand pads 30 fit comfortably and are equally spaced around the child. This is extremely important since the hand brackets 32 are preventing the child from falling off the Marsupilami ride.

Figure 4:
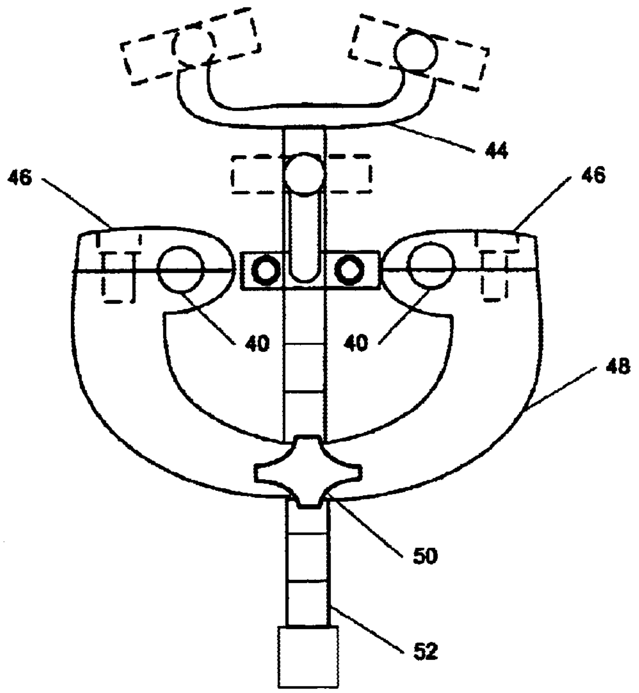
FIG. 4 illustrates a headrest configuration top view in accordance with an exemplary embodiment of the present invention.
Figure 5:
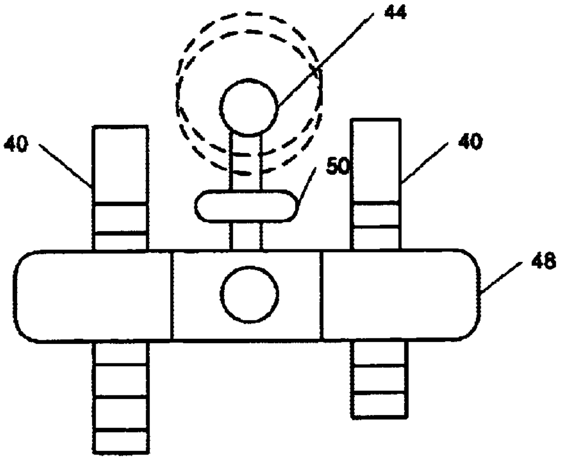
FIG. 5 illustrates a headrest configuration rear view in accordance with an exemplary embodiment of the present invention.

FIGS. 4–5 illustrate a top and rear view, respectively, of the headrest support configuration used in the modified Marsupilami device. The headrest support configuration includes a headrest assembly 44 (pads not shown). Headrest assembly 44 is attached to headrest rod 52 and is horizontally positioned by sliding the headrest assembly 44 and headrest rod 52 back or forth. A clamping knob 50 is used to secure the headrest rod 52 to headblock 48. The headblock 48 can be adjusted vertically on the spine rods 40 to properly set the height of the headrest assembly 44 for the child.

The headrest 44 used with this exemplary embodiment is a Whitmeyer Biomechanix Soft 3 support, featuring contoured gel pads mounted to ball and socket joints. The assembly 44 slides back and forth on a head block 48, and is secured with a threaded clamping knob 50. The height of the head block 48 is adjusted by loosening the locking screws 46 and sliding the bracket 48 up and down on the spine rods 40 and then retightening. To adjust the depth of the headrest assembly 44, the clamping knob 50 on the head block 48 is loosened and the headrest 44 is slid to the desired location, and then the clamping knob 50 is retightened. The shape of the headrest's suboccipital pads may require this bracket 48 to slide back when the child gets on or off the Marsupilami ride.

Once the child is properly positioned and secured on the Marsupilami, then the unit may be plugged in. Optionally, the unit can stay plugged into the wall during fitting of the child to the device if the head switch plug has been pulled out of its receptacle. This stereo style plug is located on the top of the glitter-painted shell, underneath the body of the Marsupilami.

When the Marsupilami is first plugged in, the lights will start flashing and the music will play periodically. The unit will not run until the circuit has been primed by pressing a button on the control panel, such as that depicted in FIG. 6. Thereafter, pressing either the button or the head switch will start a run cycle. A safety feature built into the head switch circuit prevents the child from initiating multiple run cycles while the Marsupilami is running. When the head switch is used to start the Marsupilami, a timer relay on the control panel starts counting down and isolates the head switch so that pressing the head switch while the unit is running has no effect. This assumes that the run period and the control panel timer have been set for similar times. The unit is preset to run for two minutes and the head switch timer is set for two minutes and six seconds. At least a six second difference should always be used regardless of the run period.

Figure 6:
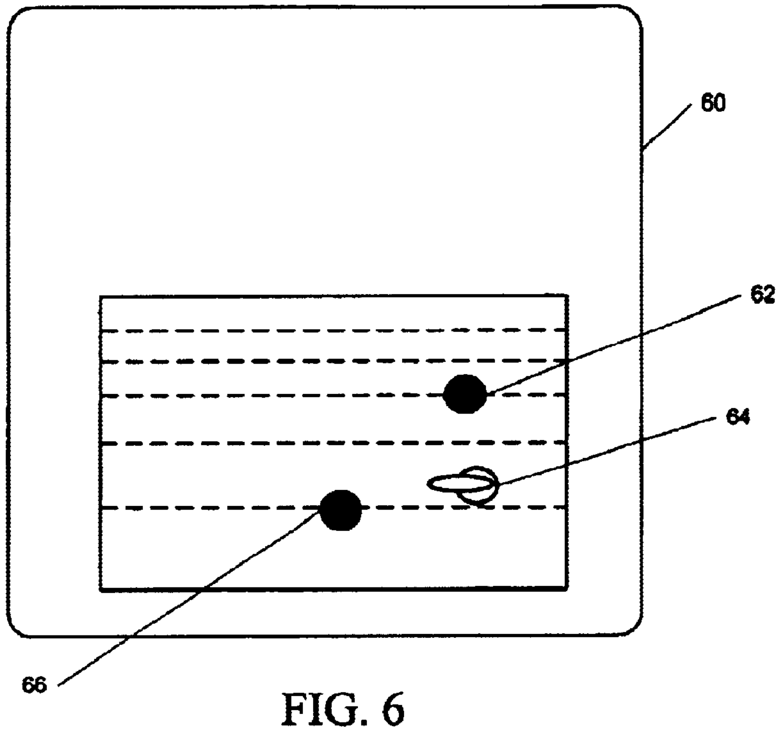
FIG. 6 illustrates the electronic control box for a child's amusement ride in accordance with an exemplary embodiment of the present invention.
Figure 7:
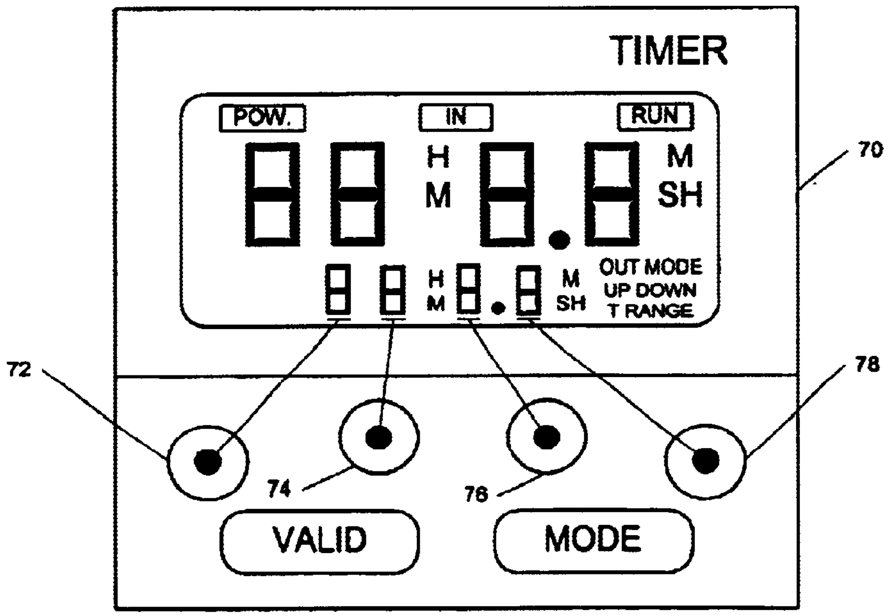
FIG. 7 illustrates the control panel for a head switch timer delay in accordance with an exemplary embodiment of the present invention.

Underneath the fiberglass shell of the Marsupilami is an electronic box that controls the motor function, speaker (on/off switch 64 and volume knob 66), and lights. This electronics box is illustrated in FIG. 6. Turning the time period dial (potentiometer) 62 clockwise increases the run time. There is no readout associated with the dial; therefore, it is necessary to use a watch with a second hand to determine how long the new run period is. Once that time has been determined, the delay period on the control panel is adjusted accordingly. The head switch timer control panel delay is illustrated in FIG. 7. The four touch pads (72, 74, 76, 78) at the bottom of the timer face 70 are used to adjust the timer. Pressing each of the buttons 72, 74, 76, 78 will scroll the numbers above it 0–9. For example, if the Marsupilami is running for four minutes 15 seconds, the control panel timer should be adjusted to at least 4 minutes 21 seconds. This allows for a minimum of 2 seconds to pass from when the Marsupilami stops before it can be turned on again. The remaining 4 seconds are used by the internal electronics as a "get ready" delay from the moment the switch is activated and the Marsupilami starts to move again.

Those skilled in the art will appreciate that many modifications to the exemplary embodiments of the present invention are possible without departing from the spirit and scope of the present invention. In addition, it is possible to use some of the features of the present invention without the corresponding use of other features. Accordingly, the foregoing description of the exemplary embodiments are provided for the purpose of illustrating the principles of the present invention and not in limitation thereof since the scope of the present invention is defined solely by the appended claims.

What is claimed is:

1. An apparatus for enabling a physically-challenged person to receive vestibular motion therapy, comprising:

an amusement-type carriage device;

an adjustable torso support mounted on the amusement-type carriage device for providing lateral support to the physically-challenged person while seated on the amusement-type carriage device when the amusement-type carriage device is operating;

an adjustable headrest support mounted on the amusement-type carriage device for providing head and neck support to the physically-challenged person; and a head switch for starting the operation of the carriage device.

2. The apparatus for enabling a physically-challenged person to receive vestibular motion therapy of claim 1 further comprising a lap belt for securely positioning the physically-challenged person inside the torso support.

3. The apparatus for enabling a physically-challenged person to receive vestibular motion therapy of claim 1 wherein the torso support comprises:

a pair of rotatable support arms;

a plurality of vertically-mounted spine rods secured by a plurality of locking screws for adjusting the height of the pair of support arms to accommodate the physically-challenged person;

a pair of adjustable hand brackets fastened to the pair of rotatable support arms; and a pair of hand pads attached to the hand brackets and secured around the torso of the physically-handicapped person underneath the arms on each side of the rib cage.

4. The apparatus for enabling a physically-challenged person to receive vestibular motion therapy of claim 1 wherein the adjustable headrest support comprises:

an adjustable headrest assembly attached to a headrest rod for adjusting the depth of the headrest assembly;

a headblock attached to the headrest rod by a clamping knob for adjusting the height of the headrest assembly.

5. The apparatus for enabling a physically-challenged person to receive vestibular motion therapy of claim 1 wherein the amusement-type carriage device operates to provide at least one of pitch, roll, and yaw motion in three-dimensional space.

6. The apparatus for enabling a physically-challenged person to receive vestibular motion therapy of claim 1 further comprising a control panel for setting the run time of the carriage device.

7. The apparatus for enabling a physically-challenged person to receive vestibular motion therapy of claim 6 wherein the control panel includes a timer relay for delaying the time between activation cycles of the carriage device.

8. The apparatus for enabling a physically-challenged person to receive vestibular motion therapy of claim 1 wherein the carriage device is a modified Marsupilami device.

9. An apparatus for enabling a physically-challenged person to receive vestibular motion therapy, comprising:

an amusement-type carriage device;

an adjustable seat attached to a base of the amusement-type carriage device by a spring mechanism and providing back support;

an adjustable torso support mounted on the amusement-type carriage device for providing lateral support to the physically-challenged person while seated on the amusement-type carriage device when the amusement-type carriage device is operating;

an adjustable headrest support mounted on the amusement-type carriage device for providing head and neck support to the physically-challenged person; and a head switch for starting the operation of the amusement-type carriage device.

10. The apparatus for enabling a physically-challenged person to receive vestibular motion therapy of claim 9 further comprising an adjustable shoulder strap for securing the physically-challenged person in a stable, upright condition during operation.

11. The apparatus for enabling a physically-challenged person to receive vestibular motion therapy of claim 9 wherein the torso and hip support comprises:

a pair of rotatable support arms;

a plurality of vertically-mounted spine rods secured by a plurality of locking screws for adjusting the height of the pair of support arms to accommodate the physically-challenged person;

a pair of adjustable hand brackets fastened to the pair of rotatable support arms; and a pair of hand pads attached to the hand brackets and secured around the torso of the physically-handicapped person underneath the arms on each side of the rib cage.

12. The apparatus for enabling a physically-challenged person to receive vestibular motion therapy of claim 9 wherein the adjustable headrest support comprises:

an adjustable headrest assembly attached to a headrest rod for adjusting the depth of the headrest assembly;

a headblock attached to the headrest rod by a clamping knob for adjusting the height of the headrest assembly.

13. The apparatus for enabling a physically-challenged person to receive vestibular motion therapy of claim 9 further comprising a control panel for setting the run time of the amusement-type carriage device.

14. The apparatus for enabling a physically-challenged person to receive vestibular motion therapy of claim 13 wherein the control panel includes a timer relay for delaying the time between activation cycles of the amusement-type carriage device.

15. The apparatus for enabling a physically-challenged person to receive vestibular motion therapy of claim 9 wherein the carriage device is a rocking horse type device.

16. The apparatus for enabling a physically-challenged person to receive vestibular motion therapy of claim 9 wherein the amusement-type carriage device operates to provide at least one of pitch, roll, and yaw motion in three-dimensional space.

* * * * *